United States Patent
Fischer (10) Patent No.: US 10,584,952 B2
(45) Date of Patent: *Mar. 10, 2020

(54) MEASURING PROBE FOR NON-DESTRUCTIVE MEASURING OF THE THICKNESS OF THIN LAYERS

(71) Applicant: Helmut Fischer GmbH Institut fuer Elektronik and Messtechnik, Sindelfingen (DE)

(72) Inventor: Helmut Fischer, Oberaegeri (CH)

(73) Assignee: HELMUT FISCHER GMBH INSTITUT FUER ELEKTRONIK UND MESSTECHNIK, Sindelfingen (DE)

( * ) Notice: Subject to any disclaimer, the term of this patent is extended or adjusted under 35 U.S.C. 154(b) by 647 days.

This patent is subject to a terminal disclaimer.

(21) Appl. No.: 14/723,027

(22) Filed: May 27, 2015

(65) Prior Publication Data

US 2015/0253122 A1 Sep. 10, 2015

Related U.S. Application Data

(63) Continuation of application No. 13/066,797, filed on Apr. 25, 2011, now Pat. No. 9,074,880.

(30) Foreign Application Priority Data

Apr. 23, 2010 (DE) .................. 20 2010 006 061 U (51) Int. Cl.
*G01B 7/06* (2006.01)
*G01B 21/08* (2006.01)
*G01B 7/00* (2006.01)

(52) U.S. Cl.
CPC .............. *G01B 7/10* (2013.01); *G01B 7/001* (2013.01); *G01B 7/105* (2013.01); *G01B 21/08* (2013.01)

(58) Field of Classification Search
CPC .......... G01B 7/10; G01B 7/105; G01B 7/001; G01B 21/08; G01B 7/00; G01B 7/06;
(Continued)

(56) References Cited

U.S. PATENT DOCUMENTS 2,933,336 A * 4/1960 Pritchard ............ F16C 11/0619
280/93.511
3,568,885 A * 3/1971 Spencer ................. G01B 5/066
222/23

(Continued)

FOREIGN PATENT DOCUMENTS

DE 102005054593 A1 5/2007
GB 952106 A 3/1964
(Continued)

OTHER PUBLICATIONS

European Search Report dated Jul. 21, 2015, from corresponding European Patent Application No. EP 11 16 2540.

*Primary Examiner* — Douglas X Rodriguez
*Assistant Examiner* — Brent J Andrews
(74) *Attorney, Agent, or Firm* — Kriegsman & Kriegsman (57) ABSTRACT

Measuring probe for non-destructive measuring of the thickness of thin layers, in particular in cavities, which are accessible by an opening or on curved surfaces, with a measuring head, which includes at least one sensor element and at least one contact spherical cap, assigned to the sensor element on a surface, to be checked, of the cavity, and with a gripping element for positioning and guiding the measuring probe on and/or along the surface to be measured, wherein on the gripping element, a long, elastically yielding guide bar is provided, which accepts the at least one measuring head on its end opposing the gripping element, in such a way that it is moveable with at least one degree of freedom in relation to the guide bar.

24 Claims, 7 Drawing Sheets

(58) Field of Classification Search
CPC .......... G01B 5/06–068; G02B 23/2476; H01R 13/523; H01R 13/5205; H01R 4/60
See application file for complete search history.

(56) References Cited

U.S. PATENT DOCUMENTS

| | | | | |
|---|---|---|---|---|
| 4,117,402 A | * | 9/1978 | Zangger | G01B 7/10 324/220 |
| 4,241,609 A | * | 12/1980 | Bergman | G01B 17/02 73/623 |
| 5,006,799 A | | 4/1991 | Pfanstiehl | |
| 5,843,031 A | * | 12/1998 | Hermann | A61B 17/12036 604/95.01 |
| 6,978,675 B2 | * | 12/2005 | Eagan | G01M 7/00 73/587 |
| 2002/0021125 A1 | * | 2/2002 | Fischer | G01B 7/105 324/229 |
| 2004/0165198 A1 | * | 8/2004 | Fischer | G01B 21/08 356/630 |
| 2005/0041097 A1 | | 2/2005 | Bernstein et al. | |
| 2005/0126264 A1 | * | 6/2005 | Komninos | G01M 3/24 73/40.5 A |
| 2007/0103178 A1 | | 5/2007 | Kasukabe et al. | |
| 2007/0186434 A1 | | 8/2007 | Fischer | |
| 2007/0247639 A1 | | 10/2007 | Amstel et al. | |
| 2008/0026647 A1 | * | 1/2008 | Boehnlein | G02B 23/2476 439/882 |
| 2008/0116911 A1 | | 5/2008 | Fleischer et al. | |
| 2008/0252328 A1 | | 10/2008 | An et al. | |
| 2009/0195244 A1 | | 8/2009 | Mouget et al. | |
| 2010/0097057 A1 | * | 4/2010 | Karpen | G01N 21/8806 324/238 |
| 2011/0260721 A1 | | 10/2011 | Fischer | |

FOREIGN PATENT DOCUMENTS

| | | |
|---|---|---|
| JP | 2003014444 A | 1/2003 |
| JP | 2004012167 A | 1/2004 |

* cited by examiner

MEASURING PROBE FOR NON-DESTRUCTIVE MEASURING OF THE THICKNESS OF THIN LAYERS

The invention relates to a measuring probe for non-destructive measuring of the thickness of thin layers in cavities of objects, which are accessible through an opening.

In DE 10 2005 054 593 A1, a measuring probe for non-destructive measuring of the thickness of thin layers is known, which comprises at least one sensor element in a housing. A contact spherical cap is assigned to this sensor element, so that the measuring probe can be placed by this contact spherical cap on the surface of a coating to be measured. Subsequently, non-destructive measuring of the layer thickness can be carried out with a measuring probe of this type. In general, measuring probes of this type are manually placed on the measurement surface for carrying out measurements. Use of a measuring stand can also be intended. In the process, sufficient accessibility to the measurement surface should be given, in order to be able to place a measuring probe of this type.

Due to increasing quality requirements on one hand, and increasing cost pressure on the other hand, it is necessary that cavity coatings, for example, are also checked and monitored. For example, in the motor vehicle industry, cavities are coated in the sill area of the body work. This is done by a cathodic dip coating or dipping varnish coating. Due to the constructive design, cavities of this type can only be accessed through small openings.

The object of the invention is to create a measuring probe, through which coatings in cavities in particular can be checked, or the thickness of cavity coatings or poorly accessible regions can be determined in a non-destructive way.

According to the invention, this object is achieved by a measuring probe according to the features of claim 1. Other preferred embodiments and further developments are given in further claims.

By means of the measuring probe according to the invention, with a gripping element, on which an elongated and elastically yielding guide bar is arranged, which accommodates at least one measuring head on its free end, which is moveable with at least one degree of freedom relative to the guide bar, the at least one measuring head is inserted into a small opening in a cavity or into a region which is not easily accessible from the outside, and subsequently moves towards a surface to be measured in the cavity or poorly accessible region via the guide bar. Whilst the at least one measuring head is being, once or more, placed on or guided along the coating in the cavity the layer thickness of the coating can be determined at one point or at different points, so that cavity coatings in particular can be checked for quality by a measuring probe of this type. A minimum force can be applied to the at least one measuring head by the elongated and elastically yielding guide bar, in order to ensure that the at least one measuring head is reliably contacted against the surface to be measured. Simultaneously, contact against a curved measurement surface can also be facilitated in a simple way without correspondingly orienting the guide bar relative to the measurement surface. Due to the articulatable mounting of the at least one measuring head with at least one degree of freedom relative to the guide bar, the measuring head can autonomously straighten up on the measurement surface and lie on the measurement surface in a position which is correct for carrying out the measurement of the layer thickness, independently of the holding position of the gripping element of the measuring probe, since the holding position of the fixed guide bar, and thus angle position of the guide bar, in relation to the measuring head, changes and adapts whilst the measuring head is contacted against or guided along the measurement surface. In this way, a measuring probe or internal probe is created, which facilitates simple handling in measuring and checking of a coating in a cavity.

A preferred configuration of the measuring probe intends that the at least one measuring head is preferably removably arranged in a housing, which is attached to the guide bar in such a way that it is moveable with at least one degree of freedom. This arrangement has the advantage that the measuring head can be removable for different applications and is protected in the housing.

In a preferred embodiment of the measuring probe the housing and the guide bar are interconnected by at least one hinge axis, in particular a hinge axis being provided which is oriented perpendicular to the longitudinal axis of the measuring head, the longitudinal axis of the measuring head being oriented substantially perpendicular to the surface to be measured. This arrangement is formed in a simple manner in terms of construction and makes it possible, during the contact of the measuring head against the measurement surface, to compensate between the direction of guidance of the measuring probe and of the measurement surface.

In an alternative embodiment of the measuring probe the housing, which receives the measuring head, and the guide bar are interconnected by a ball-and-socket joint. Such a ball-and-socket joint enables a three-dimensional change to the position of the measuring head relative to the guide bar. The position of the at least one measuring head relative to the measurement surface can thus be adapted in a very versatile manner.

In a further alternative embodiment of the invention the at least one measuring head is arranged on a carrier plate which is retained by a plurality of strip-shaped, in particular planar strip-shaped spring elements and is opposingly connectable to the guide bar via a connection element. This arrangement affords the advantage that, when the measuring probe is contacted against a surface to be checked, the strip-shaped spring elements, arranged side by side, enable an at least low level of pressure against the at least one measuring head so it reliably touches the measurement surface. Furthermore, an at least slight rotation about the common longitudinal axis of the individual spring elements is simultaneously made possible by the spring elements arranged side by side. This arrangement thus affords the advantage that the at least one measuring head is mounted in a friction-free manner in terms of deflection and pivotability relative to the guide bar. The strip-shaped spring elements are preferably retained and connected by a connection element which can be connected to the guide bar in a simple manner. This results in simple assembly and disassembly. In addition, the signal lines guided along on the guide bar can be contacted in a simple manner with the signal lines on the guide bar, for example by clamping, via a screw, locking or clamping connection.

In a preferred configuration of this alternative embodiment the spring elements are arranged side by side in a plane and at a distance from one another. The radial deflection of the guide head relative to the longitudinal axis of the guide bar or the spring elements can thus be determined. At the same time the resilience can be increased in the direction of contact. The ends of the spring elements oriented towards the carrier plate are preferably applied at the centre of gravity of the carrier plate or in the centre of gravity of the probe unit. It can thus be ensured that the at least one measuring head is arranged on the measurement surface to be checked in a correct position. For example, such a probe unit may consist of a carrier plate comprising a measuring head and at least one auxiliary pole or of two different measuring heads and optionally one auxiliary pole, in such a way that a two-point or three-point bearing is formed. Alternatively, three measuring heads, which all differ from one another or of which only one differs from the others, may be provided.

Furthermore, the strip-shaped spring elements are preferably electrically conductive. This makes it possible for these spring elements to serve a double purpose and removes the need for additional electrical lines. The weight of the entire probe unit can thus be reduced considerably and the effect of further interfering forces, which have a negative impact on the measurement, can thus be eliminated.

Furthermore, in this alternative embodiment the carrier plates can be placed in the housing and the spring elements can be arranged so as to be removable from the housing. The spring elements thus also carry the housing, which protects the individual elements.

Furthermore, an energy storage element is preferably arranged between the carrier plate and the housing and supports the at least one measuring head in a sinkable manner relative to the housing. The at least one measuring head is thus protected if too much force is applied. This energy storage element can preferably be applied in the centre of gravity of the carrier plate or the probe unit.

Advantageously, an auxiliary pole is arranged adjacent to the at least one measuring head. Through this, a so-called guide shoe can be created, which is arranged so that it is moveable with at least one degree of freedom in relation to the guide bar, and independently of the orientation of the guide bar, enables the sensor element to be placed on the measurement surface in a defined way, or enables a defined orientation of the sensor element in relation to the measurement surface. The at least one measuring head and the at least one auxiliary pole are preferably arranged adjacent to one another, so that the measuring probe is oriented essentially at right angles to the measurement surface by the guide shoe. Therefore, measurement errors due to incorrect handling can be considerably reduced. The auxiliary pole is particularly designed as a contact spherical cap, a roller or a sliding component. It is common to all embodiments that this is contacted smoothly against the surface and autonomously aligns with the measurement surface and is optionally guided along the surface, in order to avoid damages, whereby the auxiliary pole is preferably arranged lagging behind the measuring head whilst a measurement is being carried out. In the embodiment in which the housing is preferably connected to the guide bar via a hinge axis or a ball-and-socket joint, the at least one auxiliary pole is arranged on the housing. In the further alternative embodiment in which the at least one measuring head is arranged on the carrier plate, the at least one auxiliary pole is arranged on the carrier plate.

In accordance with a preferred configuration of the measuring probe the at least one measuring head detects a layer thickness by a magnetic induction measurement method, by an eddy current method or by a d.c. field method, or else by a magnetic method using a Hall probe, and the at least one further measuring head detects a layer thickness by any one of the aforementioned methods. Such a measuring probe can thus be used universally with the use of two or more different measuring heads, the identical or different measuring heads being arranged side by side without it being necessary to replace the measuring heads on the guide bar.

In this embodiment it is preferred that a pivotal point lies between these two different measuring heads in a longitudinal axis formed by the strip-shaped spring elements arranged side by side, or a centre of gravity is formed between two measuring heads and an auxiliary pole or three measuring heads.

When measuring curved surfaces the two different measuring heads are preferably oriented relative to the guide bar or gripping element in a line relative to the measurement along a surface line along the surface. A reliable arrangement on the measurement surface can thus be provided and accurate measurement results can be obtained.

Furthermore, two auxiliary poles are provided which form a three-point bearing together with the one measuring head. Alternatively, two measuring heads, in particular two different measuring heads, can also form a three-point bearing with one auxiliary pole. The housing or the carrier plate can thus be oriented autonomously relative to the measurement surface independently of the orientation of the guide bar, in such a way that the measuring head lies perpendicular to the measurement surface. A substantially perpendicular positioning of the measuring head relative the measurement surface is thus also possible if the orientation of the measurement surface changes or, for example, if the measurement surface proceeds in a curved manner.

This measuring probe preferably has an arrangement, in which a hinge axis or a ball-and-socket joint is provided in the region between the measuring head and the at least one auxiliary pole, in order to connect the housing to the guide bar. The housing is held to the guide bar in a flexible or pivotable manner by this hinge axis. Therefore, the measuring head, together with the auxiliary pole, can be correctly positioned in relation to the measurement surface, and can be placed on the measurement surface independently of the orientation of the guide bar.

Furthermore, the hinge axis or ball-and-socket joint connecting the housing and the guide bar is preferably positioned nearer to the measuring head than to the auxiliary pole. Through this, at least a low placing moment or line moment is effected on the measuring head, since the lever arm between the hinge axis and the auxiliary pole is at least slightly larger than the lever arm between the hinge axis and the measuring head. Without further additional tools, secure contact of the measuring head on the surface to be checked can be ensured.

Furthermore, the measuring head is arranged in the housing so that it is preferably at least slightly moveable along its longitudinal axis. It can therefore be ensured that the measuring head lies securely on the measurement surface. A pressing force which is too high can also be avoided at the same time.

An alternative configuration of the measuring probe provides an antitwist protection or an energy storage element between the guide bar and the measuring head, which positions the measuring head in an initial position which is inclined to the guide bar or predefined. Therefore, when inserting the measuring probe through an opening in a cavity, it can be ensured that the measuring head is oriented to the guide bar in a known position, and that secure contact of the measuring head on the surface to be checked is subsequently facilitated by simple handling, although this positioning of the measuring head inside of the cavity is hard to see from outside, or can no longer be seen.

The guide bar of the measuring probe preferably comprises an elongated base body with a curved course, whereby the guide bar is designed rigidly, with regard to its cross-sectional axes, and is designed to be at least slightly elastically yielding in its longitudinal direction. Therefore, the guide bar has a relatively torsion-resistant design, so that simply at least a slight flattening of the curvature, or a severe tilting of the curvature of the guide bar, is made possible. Therefore, precise guiding of the measuring head is given. Owing to this preferred curved course of the guide bar, a selective and sufficient sinking and insertion of the guide bar into the cavity is made possible with subsequent reliable contact of the at least one measuring head, even in the case of a very small cavity. Alternatively the guide bar may also extend in a straight manner and can thus be inserted into pipes, profiled parts, hoses or the like in order to measure an inner coating.

The guide bar preferably has at least one sliding surface or contact surface on its inner side of its curvature. This sliding surface or contact surface permits a targeted, non-tilting guiding of the measuring head along an edge on a opening leading into the cavity.

Furthermore, the guide bar preferably has a U-shaped recess extending in the longitudinal direction, which is particularly provided on an inner side of the curved base body of the guide bar, into which signalling lines, leading to the measuring head, are guided. This arrangement simultaneously facilitates a protected acceptance of the signalling lines, since sliding surfaces and contact surfaces in particular, which are provided on the free U-shaped sides of the recesses, slightly protrude opposite the signal lines, and which protect these.

Furthermore, the guide bar can have a curved form over its whole length. An equal curvature is preferably provided in this process. Alternatively, this curvature can comprise different radii, which are adapted to the geometry of the cavity, and which facilitate optimal guiding of the measuring head along the surface or coating to be checked in the cavity.

In a preferred embodiment of the invention the guide bar is formed in a number of parts and preferably two adjacent bar portions can be interconnected by a coupling element. On the one hand this configuration makes it possible for different lengths of a guide bar to be formed and to be adapted to the specific application. On the other hand an application-specific adaptation to different levels of accessibility to the cavities and to the geometries of the cavities is thus made possible. For example, with very small cavities a rather straight or less curved guide bar can be formed, whereas with other cavities a rather curved guide bar can be formed for deep insertion into the cavity. The coupling elements preferably form a plug-in connection with the rod portion, which are for example rigidly interconnected lockingly or by a press fit and can preferably also be detached from one another again for a modular construction.

In a further preferred configuration of the multi-part guide bar the coupling element has a flexible kink which preferably returns by a forced deflection into the starting position thereof. For example this flexible kink can be formed of plastics material, metal or the like. On the one hand a contact device of the at least one measuring head transferred by the gripping element is thus obtained, and on the other however an elastically yielding guide bar is in turn formed at the same time.

Furthermore, for connection of the signal lines the coupling element preferably comprises a plug-in contact for a through connection. For example, automatic contacting with a connection line in the coupling element can be achieved when the rod portion is inserted into the coupling element, so as to electrically contact the adjacent rod portion, which is also received by the same coupling element, with the rod portion ahead or to connect electrical lines or signal lines guided in the rod portion.

In a first advantageous configuration of the guide bar, this is made of a metallic material, particularly of spring steel, and can preferably be produced by machining or by a forming process. Guide bars of this type have high stability and high resilience with a high ability to spring back, in order to return to the original form after a deflection.

A further alternative configuration of the guide bar intends that this is produced from a thermoplastic elastomer. This plastic can comprise similar characteristics to metallic material, particularly spring steel. This guide bar made of plastic can also be produced by machining, as well as by a press-bending process.

A further alternative configuration of the guide bar intends that this is made from a plastic composite matrix, in which the conducting paths are preferably embedded. For a plastic composite matrix of this type, for example, glass fibre fabric, carbon fibre fabric or another fibre-reinforced plastic material can be used, which is preferably placed in a mould, in order to produce the contour of the guide bar by further filling with resin or similar. The signalling lines can be linked at the same time. In production of the signalling lines, the contour of the guide bar can also be produced simultaneously.

The invention as well as further advantageous embodiments and further developments of the same are subsequently explained in more detail and illustrated by means of the examples shown in the drawings. The features to be taken from the description and the drawings can be used individually or severally in any combination according to the invention. In the drawings.

Figure 1:
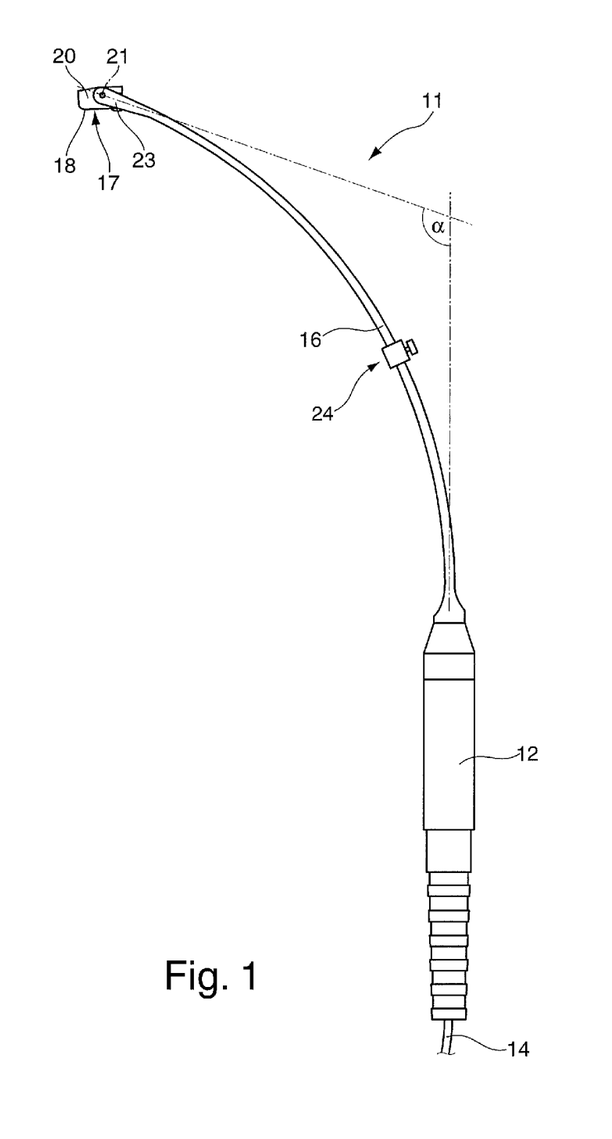
FIG. 1 shows a schematic side view of a measuring probe according to the invention.

A schematic side view of a measuring probe 11 according to the invention is shown in FIG. 1. A further schematic view of the measuring probe is given in FIG. 2. A measuring probe 11 is also denoted as a internal measuring probe or internal probe, which is used for non-destructive measuring of the thickness of thin layers, particularly in cavities, which are accessible by an opening, for example, or in areas which are hard to access.

Figure 2:
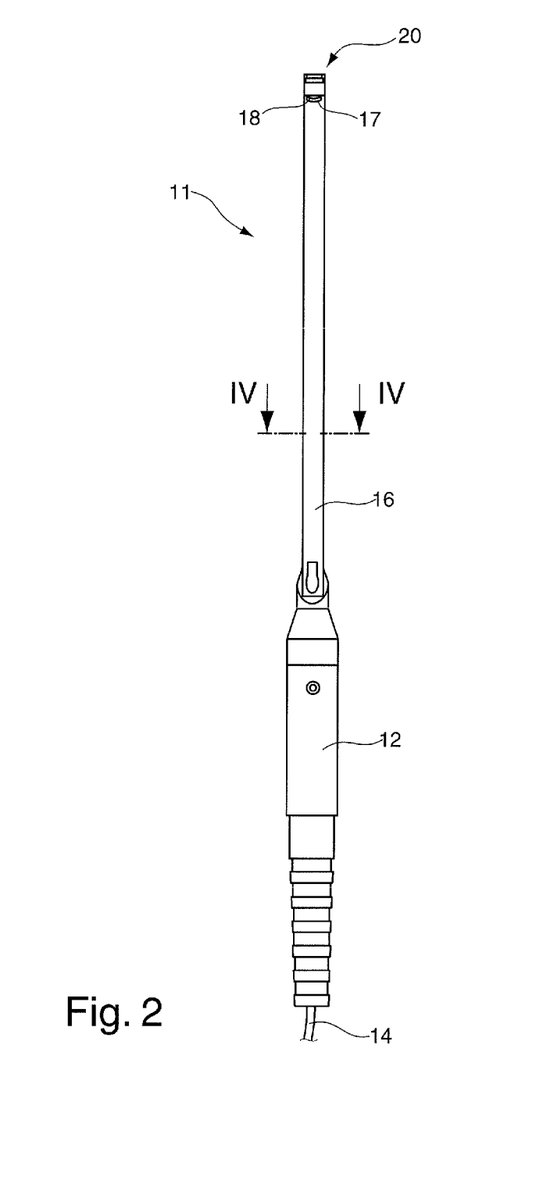
FIG. 2 shows a further schematic view of the measuring probe according to FIG. 1.

The measuring probe 11 includes a gripping element 12, in which a connecting line 14 opens out, which connects the measuring probe 11 to an evaluation device, not shown in detail. The gripping element 12 accepts a guide bar 16, which comprises on its front end a measuring head 17 with at least one sensor element 18, which is held to the guide bar 16 in such a way that it can be deflected with at least one degree of freedom. The measuring head 17 is arranged in a housing 20, which is connected to the guide bar 16 by a hinge axis 21, for example. In the process, the guide bar 16 has a U-shaped recess or fork on the front end, and includes connecting links 23, which partly surround the housing 20, so that the housing 20 is positioned between the connecting links 23 on the guide bar 16, and is pivotally guided about the hinge axis 21. Furthermore, a stop 24 may be provided on the guide bar in a longitudinally displaceable manner along said guide bar, as a result of which stop a sinking depth of the guide bar 16 in a cavity or poorly accessible space is defined and determined. With a plurality of objects to be measured, a comparable measurement can thus always be taken at the same measurement point owing to the defined positioning of the measuring head 17 relative to the object to be measured via the stop 24.

Figure 3:
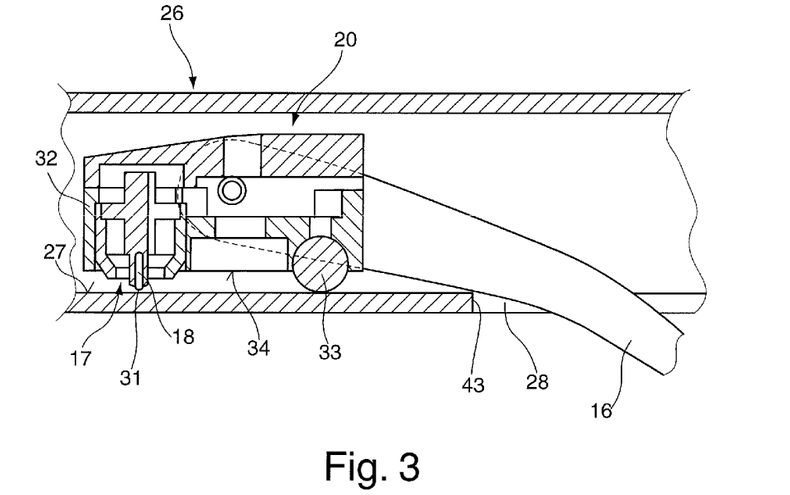
FIG. 3 shows a schematically enlarged sectional view of a measuring head of the measuring probe according to FIG. 1.

In FIG. 3, a schematically enlarged sectional representation of the housing 20 is shown with the measuring head 17 arranged therein and a front end of the guide bar 16. The measuring probe 11 is positioned with its measuring head 17 in a cavity 26 on a surface 27 to be checked, whereby the measuring head 17 can be inserted into the inside of the cavity 26 via an opening 28 in the cavity 26.

A cavity 26 of this type can be formed, for example, in the body work of a motor vehicle, particularly in the sill area or an A-pillar, B-pillar or C-pillar of the body work. Equally, cavities 26 of this type can be present in other regions of the body work, in other objects, devices or installations, which have a coating for a specific reason, for example, in order to avoid premature corrosion. A dip coating or cathodic dip coating is preferably used for coating cavities 26 in the body work of vehicles. The surfaces 27 in the cavity 26 are non-destructively checked by the measuring probe 11 regarding the layer thickness or the layer quality.

Figure 13:
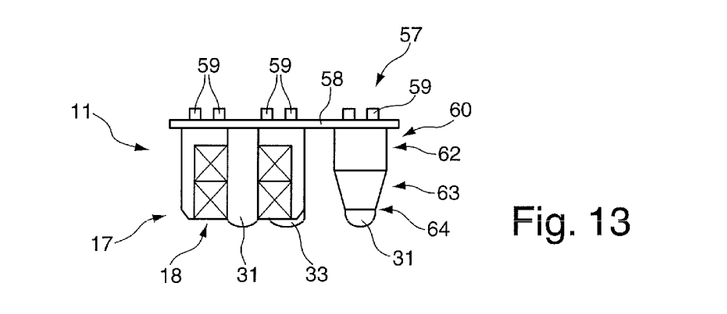
FIG. 13 shows a schematic side view of the embodiment according to FIG. 12.

The housing 20 in particular accepts the measuring head 17 in the front region. This encompasses the sensor element 18, which is oriented essentially perpendicular to the surface 27 to be checked. The sensor element 18 comprises a contact spherical cap 31 at the front end. The contact spherical cap 31 and the at least one sensor element 18 preferably both lie in the same longitudinal axis. A sensor element 18 of this type can preferably be formed by a primary and secondary coil, with a magnet, designed with at least one coil on pot magnets or as a non-shielded bipolar. A sensor element 18 of this type facilitates measuring according to the magnetic induction process. The magnetic induction measuring process is appropriate for measuring the thickness of non-ferrous metal coatings, such as for example, chrome, copper and zinc or similar on magnetisable base materials, such as for example, steel and iron, as well as for paint, lacquer and plastic layers on magnetisable base materials, such as steel and iron, for example. If the measuring area includes a layer thickness of up to 1800 μm, for example, a frequency of less than 300 Hz is preferably used. Alternatively, such a sensor element 18 can be used for carrying out measurements according to the eddy current method, that is to say, that the non-destructive measuring of the thickness of electrically non-conducting layers on non-ferrous materials, such as for example, paints, lacquers, plastics, on aluminium, copper, brass, stainless steel or other anodised layers on aluminium takes place in a high frequency alternating field. Furthermore, a measuring head 60 comprising a sensor element 61, as shown in FIG. 13, can be provided which comprises a permanent magnet 62 which is provided on a field concentrator 63 in the vicinity of a Hall sensor 64. This Hall sensor 64 lies directly behind the contact spherical cap 31. A measurement can thus be taken by the magnetic d.c. field method.

The sensor element 18 is preferably arranged in such a way that it is at least slightly moveable in the measuring head 17 or a measuring head receiver 32 relative to the housing 20. The measuring head receiver 32 is positioned in the level, preferably adjustably, in the housing 20. An auxiliary pole 33 is provided on the opposing end of the preferably elongated, rectangular shaped housing 20. This auxiliary pole 33 can also be formed by a contact spherical cap. Similarly, a ball firmly pressed in the housing 20, or a roller or similar can be provided. A support point of the auxiliary pole 33 is preferably arranged equally separated from an under side of the housing 34 as the sensor element 18 or its contact spherical cap 31.

Due to the configuration of the housing 20 with an auxiliary pole 33, and the receiver of the measuring head 17, a so-called glide shoe is created, which in a simple way can be guided by the guide bar 16 along a surface 27 to be checked, and orients itself to the surface 27 to be measured.

The hinge axis 21 is arranged between the auxiliary pole 33 and the sensor element 18 or measuring head 17, which arranges the housing 20 so that it is pivotable with at least one degree of freedom in relation to the guide bar 16. Alternatively, the housing 20 can be articulated to the guide bar 16 with several degrees of freedom by a plurality of hinge axes.

In the embodiment shown in FIG. 3, the hinge axis 21 is preferably positioned nearer to the measuring head 17 than to the auxiliary pole 33. When placing the measuring probe 11 with the measuring head 17 on the surface 27, it is therefore possible for the housing 20 to be placed on the surface 27 by the auxiliary pole 33, first of all, and due to the leverage, secure contact of the measuring head 17 on the same surface 27 is subsequently achieved and is maintained. A three-point bearing is advantageous in order to reliably measure coatings in the cavity 26 or poorly accessible region. Such a three-point bearing can be provided, for example, by a measuring head and two auxiliary poles or, as will be described hereinafter in detail, by two measuring poles or two measuring heads, by two measuring poles or two measuring heads and one auxiliary pole, or by three measuring poles or three measuring heads.

Together with the measuring head 17, the sensor 18 is preferably provided on the housing 20 in such a way that it can be removed. In the process, a plug connection in particular is formed between the sensor element 18 and the signal lines 36. The signal lines 36 extend from the housing 20 along the guide bar 16 and into the gripping element 12. Depending on the configuration of the measuring probe 11, a plug can be provided in the gripping element 12, in order to connect the signal lines 36 to the access lines 14. This embodiment has the advantage that different guide bars 16 can be accepted interchangeably with the same gripping element 12, whereby the guide bars 16 can have different designs in terms of size, shape and curvature and/or in size, shape and type of measuring head 17. Alternatively, the signal line 36 can be integrally fed through the gripping element 12 and led out as an access line 14.

Figure 4:
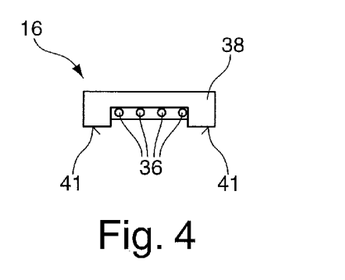
FIG. 4 shows a schematic sectional representation along the line IV-IV in FIG. 2.

A schematic sectional representation along the line IV-IV in FIG. 2 is represented in FIG. 4, which shows how a cross section of the guide bar 16 can formed, for example, as well as how the signal lines 36 can be arranged and guided to the guide bar 16.

According to a first embodiment, the guide bar 16 comprises an elongated, rectangular base body 38, which includes a U-shaped recess 39 on an external side. This recess 39 is preferably provided on an inner side, with respect to the curvature of the guide bar 16. In the U-shaped recess 39, the signal lines 36 are positioned in a protective location and can be fixed by an adhesive connection or a clamping connection. The signal lines 36 can also be cast into the U-shaped recess 39. This embodiment also has the advantage that adjacent to the U-shaped recess 39, contact surfaces 41 are formed, which are raised opposite the signal lines 36. These contact surfaces 41 provide abrasion protection for the signal lines 36, and can simultaneously glide along as a guide along an edge 43 of the opening 28 when measuring is being carried out, so that the signal lines 36 are not damaged.

The guide bar 16 preferably has a curvature in its longitudinal direction, which is shown for example in FIG. 1. This curvature can be effected along a single radius. The curvature can also be discontinuous, whereby different radii of curvature can be strung together. Independently of differently formed sections of curvature or curvature courses, the guide bar 16 has a bent or curved course, so that one axis, along the connecting links on the end of the guide bar, is at angle of between 90° and 180° to a longitudinal axis of the gripping element 12, to which the guide bar extends. In addition, sections running in a straight line can also be provided between curved sections.

In the execution example according to FIG. 4, the guide bar 16 is formed from stainless steel, and the U-shaped recess 39 is produced by milling. Equally, a transformed or drawn profile can be provided, in which, depending on the use, curvature can be introduced by removing material, or a curvature course can be introduced by bending. Alternatively, the guide bar 16, according to FIG. 4, can be formed from a plastic material or fibre-reinforced plastic. In the process, the choice of materials is to be provided in such a way that at least a low elasticity and elastic resilience are given.

Figure 5:
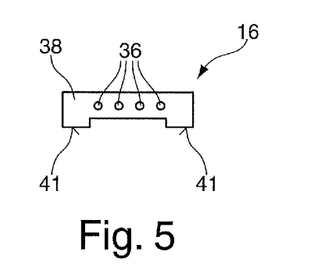
FIG. 5 shows an alternative configuration of a guide bar according to FIG. 4, FIGS. 6a and b show different working positions of the measuring probe according to FIG. 1 in a cavity for measuring the thickness of layers.

An embodiment of the guide bar 16 alternative to FIG. 4 is shown in cross-section in FIG. 5. In this embodiment, the signal lines 36 are formed as a multi-core conductor, for example, and the conductor has a plastic coating, for example, which has the same characteristics regarding the elastic resilience due to the curvature and rigidity, as well as the transverse direction of the cross-section and the torsion. In order to easily move the measuring head 17 inside of the cavity 26, a contact surface 41 is preferably formed from two narrow front sides in this embodiment.

In an alternative embodiment of the guide bar 12, not shown in more detail, there can be a combination of the embodiments of the guide bar from FIGS. 4 and 5. For example, the guide bar 16 connected to the gripping element can be initially formed of stainless steel. For example, the guide bar 16 can consist of stainless steel after half of the length, or after ⅔ of the length, exclusive of the signal lines 36 coated with plastic of a plastic matrix.

Figure 6A:
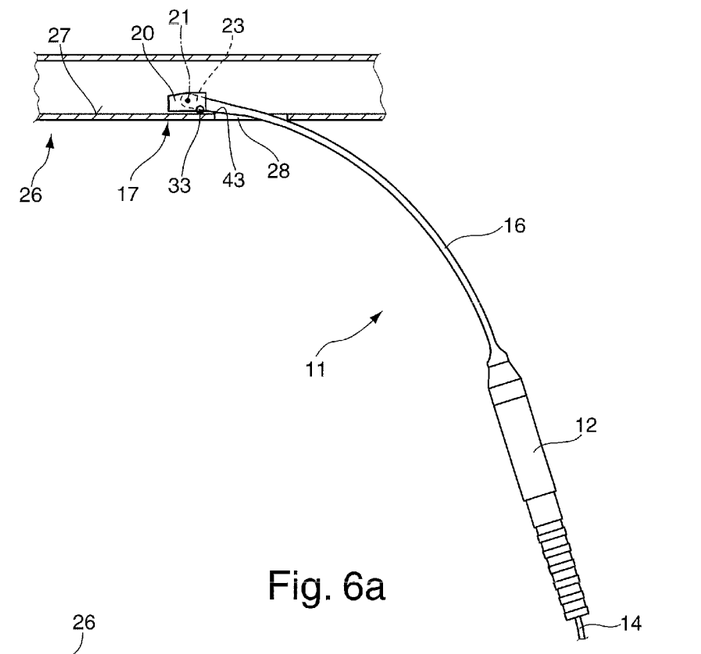
Figure 6B:
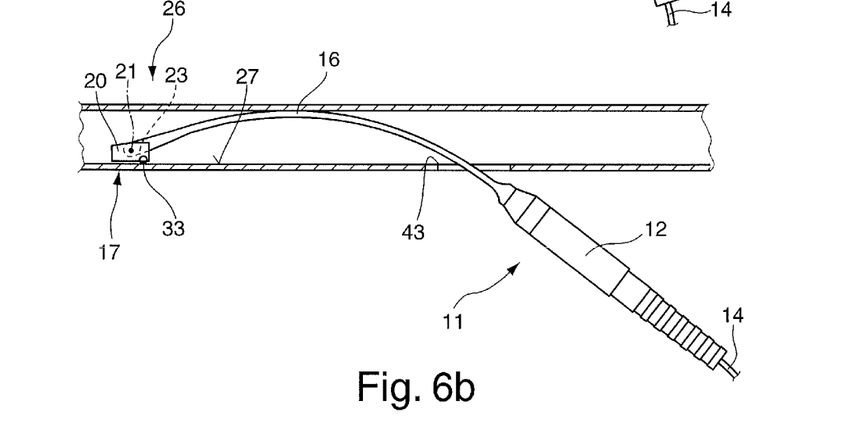

Two different work positions of the measuring probe 11 with regard to the cavity 26 are shown in FIGS. 6a and 6b. FIG. 6a shows a first work position, which protrudes in the cavity 26 directly after insertion of the measuring probe 11, and the housing 20 with the measuring head 17, which is provided for commencing measuring on the surface 27. Due to the at least one degree of freedom regarding the flexibility of the measuring head 17 in relation to the guide bar 16, the measuring head 17 can rest on the surface to be checked 27 after being fed through the opening 28. Subsequently, the measuring probe 11 is pushed further inside the cavity 26, whereby the gripping element 12 is guided in a successive manner to the housing 20, and there is a change of position of the guide bar 16 along the surface 27. For example, FIG. 6b shows such a further work position. Due to the curvature of the guide bar 16 and the positioning of the hinge axis 21 closer to the measuring head 17 than to the auxiliary pole 33, the measuring head 17 is maintained on the surface 27 to be measured. The curvature of the guide bar 16 can be adapted depending on the size of the opening 28 in the cavity 26 as well as on the internal volume of the cavity 26.

Figure 7:
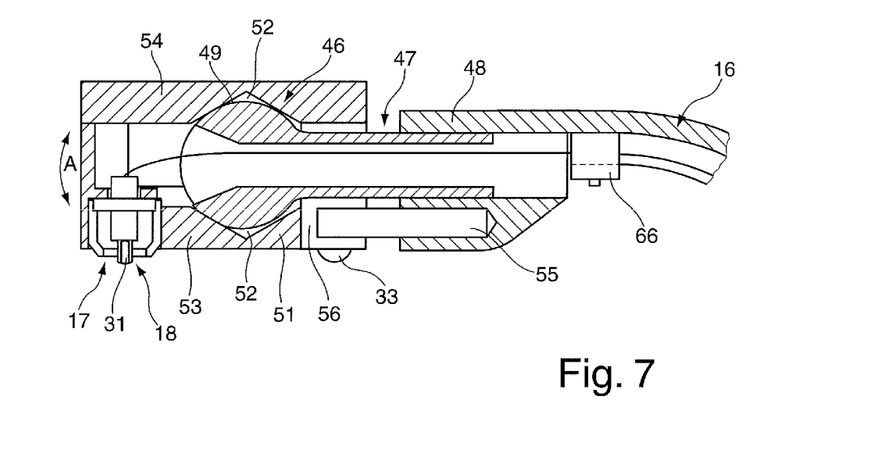
FIG. 7 shows a schematic sectional representation of an alternative embodiment to FIG. 3.

FIG. 7 shows a schematic sectional representation of a further embodiment of the measuring probe 11. This embodiment differs largely from that according to FIG. 3 in that instead of a hinge axis 21 a ball-and-socket joint 46 is provided, via which the guide bar 16 and the housing 20 are interconnected in a pivotable manner. On the end of the guide bar 16 a first hinge part 47 of the ball-and-socket joint 46 is arranged which comprises a pipe portion 48 which merges into a ball 49. This first hinge part 47 is pivotably mounted in a second hinge part 51 of the housing 20, the hinge part 51 preferably comprising a prismatic socket 52 in a housing lower part 53 and a prismatic socket 52 in a housing cover 54. This housing cover 54 is preferably fixed to the housing lower part 53 by a screw connection. In the first hinge part 47, in particular in the pipe portion 48, the signal lines 36 are guided from the guide bar 16 to the measuring head 17. In this instance the signal lines 36 are preferably connected to the measuring head 17 at the housing-side end of the guide bar 16. Alternatively to the ball-and-socket joint, a Cardan joint or the like may also be provided in order to hold the at least one measuring head 17 to the guide bar 16 in a pivotable manner.

An antitwist protection 55 is provided between the guide bar 16 and the housing 20 and is formed, for example, as a pin. This pin is rigidly connected to the guide bar 16 and engages opposingly in a recess 56 in the housing 20. This ensures that a rotation of the housing 20 about the longitudinal axis of the ball part 47 is limited within a predetermined angular range and that any pivoting is defined in the direction of the arrow A. The housing 20 can thus be oriented autonomously in an initial position relative to the guide bar 16, even in combination with the at least slight inherent rigidity of the signal lines 36 once the measuring probe 11 has been raised from the measurement surface 27.

Figure 8:
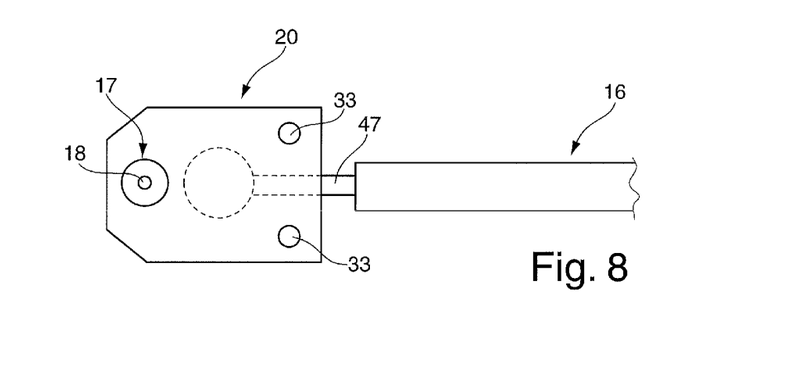
FIG. 8 shows a schematic view from beneath of the embodiment according to FIG. 6.

FIG. 8 shows a view from beneath of the housing 20 in the alternative embodiment of the measuring probe 11 comprising a ball-and-socket joint. In this embodiment two auxiliary poles 33 are arranged at a distance from the measuring head 17, in such a way that the two auxiliary poles 33 and the sensor element 18 form a three-point bearing. A defined and tilt-free arrangement of the measuring head 17 relative to the measurement surface 27 can thus be made possible. The ball-and-socket joint 46 is preferably positioned inside the triangle which is formed by the two auxiliary poles 33 and the sensor element 18. The ball-and-socket joint 46 used in this embodiment in accordance with FIGS. 7 and 8 is preferably formed with minimal friction. Correspondingly low-friction materials can be used for this purpose.

Figure 9:
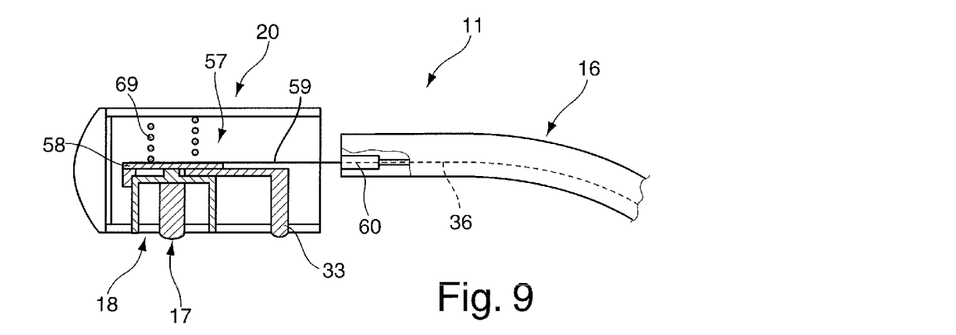
FIG. 9 shows a schematic sectional representation of a further alternative embodiment to FIG. 1.

FIG. 9 shows a schematic sectional view of a further alternative embodiment to FIG. 1. This measuring probe 11 consists of a two-part or multi-part housing 20, in which a probe unit 57 can be placed. This probe unit 57 comprises a carrier plate 58, on which spring elements 59 are arranged which are connected to the at least one measuring head 17 which is also fixed to the carrier plate 58. For example two auxiliary poles 33 (FIG. 10) are arranged adjacent to the measuring head 17 on the same side of the carrier plate 58, these auxiliary poles and the measuring head 17 preferably forming a three-point bearing. These can be arranged relative to one another in the form of an equilateral or isoceles triangle.

The spring elements are fixed on the opposite side of the carrier plate 58 and are preferably formed as strip-shaped spring elements 59. Four strip-shaped spring elements 59 are preferably formed which are applied in the centre of gravity of the carrier plate 53 or the probe unit 57. The spring elements 59 are electrically conductive, in such a way that in each case two spring elements 59 are connected to a coil of the sensor element 18. For the measurement by magnetic induction the measuring head 17 comprises a coil which is smaller in diameter and a coil which is greater in diameter, and the four strip-shaped spring elements 59 electrically contact these coils. The spring elements 59 are preferably formed of beryllium copper or the like. A simple contact and signal transfer can thus be produced between the signal lines 36 on the guide bar 16 and the measuring head 17.

The four strip-shaped spring elements 59 are preferably coupled to one another via a connection element 66, in such a way that this connection element 66 is easily fixable to the end of the guide bar 16 and it is possible to achieve contact with the signal lines 36 guided thereon or therein. These spring elements 59 further have a spring function in addition to the guide function. The probe unit 57 is mounted to the guide bar 16 in an elastically yielding manner via these spring elements 59, in such a way that a deflection is made possible in and against the longitudinal axis of the measuring head 17. At the same time, this arrangement of the spring elements 59 arranged preferably in a common plane enables a rotary movement about the common longitudinal axis 87 of the spring elements 59, in such a way that, as a result of this arrangement or as a result of the width of the strip-shaped spring elements 59 and/or their distance from one another, an angle of rotation about the common longitudinal axis 58 of the individual spring elements 59 can be determined and a tilt-free application of the measuring head 17 against the surface 27 to be measured is also made possible if the guide bar 16 is not retained or guided exactly relative to the measurement surface 27. In addition, an energy storage element 69, in particular a compression spring element, can preferably be provided in the housing 20. This energy storage element 69 is preferably formed as a spiral or conical spring element. This spring element prevents a tilting of the carrier plate 58 within the housing 20 and also orientates the measuring head 17 and optionally the auxiliary poles 33 thereof relative to the surface 27. Furthermore, a set screw (not shown in greater detail) can be provided in the housing 20 in order to adjust the spring bias of the energy storage element.

Figure 10:
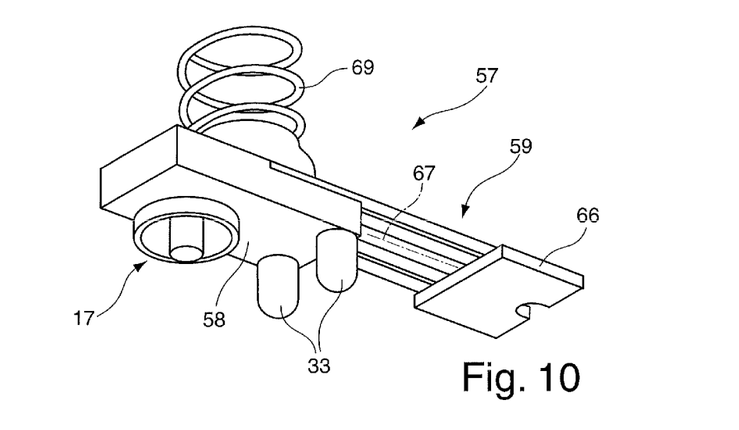
FIG. 10 shows a perspective view of a measuring head according to the embodiment in FIG. 9.
Figure 11:
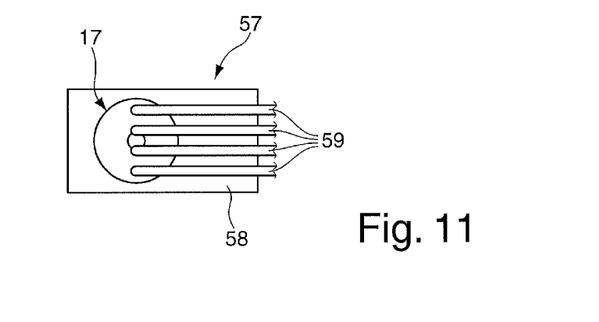
FIG. 11 shows a schematic detailed view of the measuring head with spring elements arranged thereon.

This embodiment according to FIGS. 9 to 11 is characterised in particular in that a restricted guidance of the measuring head 17 is not provided. Both the strip-shaped spring elements 59, which have a leaf-spring-like action, and the optionally additionally provided compression spring 69 work in a friction-free manner and enable the carrier plate 58 and the at least one measuring head 17 arranged thereon to sway relative to the guide bar 16, in such a way that when the measuring head 17 is applied by the three-point bearing a defined position is adopted. Such an arrangement further affords the advantage that a probe unit 57 of considerably reduced weight can be produced.

The probe unit 57 can be placed in the housing 20, wherein a housing base comprises a recess for the measuring head and the auxiliary poles 33. When the probe unit 57 is placed in the housing 20 these are closed. For example a two-part housing may be provided, as described in FIG. 7. The probe unit 57 is mounted inside the housing 20 in a tilt-free manner by the energy storage element.

Figure 12:
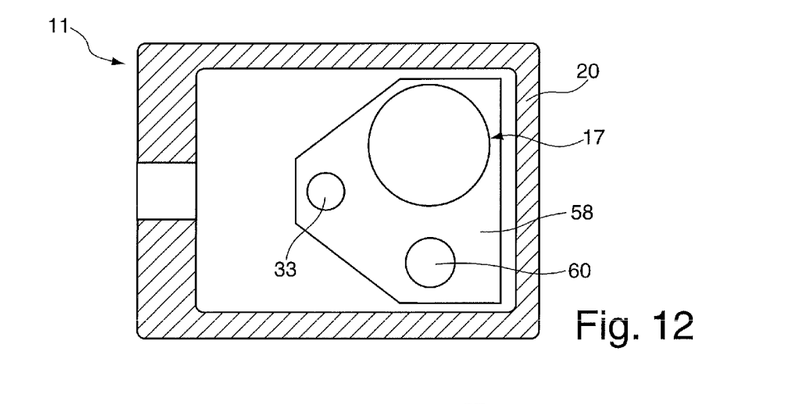
FIG. 12 shows a schematic view from above of an alternative embodiment to FIG. 9.

FIGS. 12 and 13 show an alternative embodiment of the measuring probe compared to FIGS. 9 to 11. In this embodiment a different further measuring head 60 and preferably an auxiliary pole 33 are arranged on the carrier plate 58 adjacent to the measuring head 17, in such a way that the measuring heads 17, 60 and the auxiliary pole 33 form a three-point bearing. The measuring head 17 comprises a sensor element 18 which is provided for measuring layer thicknesses by magnetic induction. The measuring head 60 comprises a sensor element 61 which is designed for measuring the layer thickness by the eddy current method. This emerges in particular from FIG. 13. Accordingly, the spring elements 59 can be adapted to the number of measuring heads 17, 60 and to the number of connections. In order to enable a preferably friction-free swaying, the spring elements 59 can be correspondingly varied in terms of their distance form one another, their thickness and/or their width. For example the measuring heads 17, 60 are oriented in the housing 20 in such a way that their line of connection is oriented at right angles to the longitudinal axis of the guide bar. For example, when placed on a curved surface the measuring heads 17, 60 can thus be oriented in a simple manner relative to the outer face of the curved surface 27. The arrangement of the measuring heads 17, 60 relative to one another and of the optionally additional auxiliary pole 33 is only exemplary and can also be provided with different positioning. The ends of the spring elements 59 are preferably applied in the centre of gravity between the measuring heads 17, 60 and the auxiliary pole 33 forming the three-point bearing and force is introduced into the carrier plate via the spring elements 59. The energy storage element 69 can also introduce force into the centre of gravity.

Figure 14:
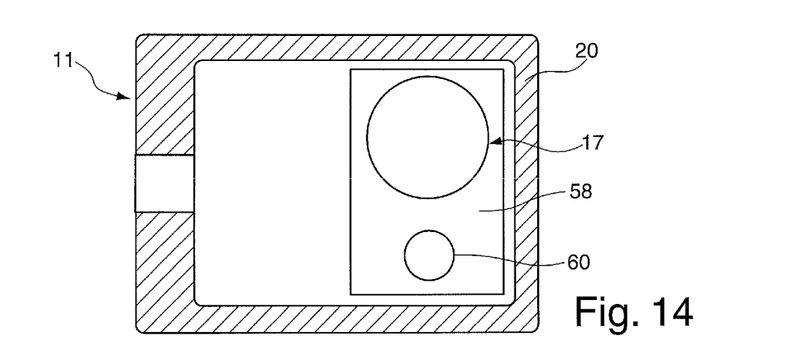
FIG. 14 shows a schematic view from above of an alternative embodiment to FIG. 12.

FIG. 14 shows a further alternative embodiment to the probe units 57 in accordance with the measuring probe 11 in FIGS. 9 to 11 or the measuring probe 11 in FIGS. 12 and 13. In this embodiment, which in principle corresponds in terms of structure to the embodiment according to FIGS. 9 to 11 and FIGS. 12 and 13, merely the measuring head 17 and the measuring head 60 are, by contrast, provided on the carrier plate 58, an additional auxiliary pole 33 having been omitted. For example, these two measuring heads 17, 60 are oriented transverse to the longitudinal direction of the guide bar 16. These can be contacted against a curved measurement surface along a surface line in a defined manner. In this instance a defined contact is likewise provided as a result of these measuring heads 17, 60 arranged in a line side by side. Alternatively, the orientation of the measuring heads 17, 60 shown in FIG. 14 can also be provided rotated through 90°.

The invention claimed is:

1. Measuring probe for non-destructive measuring of the thickness of thin layers, in particular in cavities, which are accessible by an opening or on curved surfaces, the measuring probe comprising:

a measuring head, the measuring head comprising at least one sensor element and at least one contact spherical cap assigned to the sensor element on a surface to be checked of the cavity, a gripping element for positioning and guiding the measuring probe on and/or along the surface to be measured, and a long, elastically yielding guide bar comprising an elongated base body:
having, in an original form, a curvature in its longitudinal direction, with a curved centerline,
being deflectable relative to its longitudinal axis in the direction of curvature,
having a resilience with an ability to spring back in order to return to the original form after a deflection, and
the long, elastically yielding guide bar being provided on the gripping element, and the long, elastically yielding guide bar accepting the at least one measuring head on its end opposing the gripping element in such a way that it is moveable with at least one degree of freedom in relation to the guide bar.

2. Measuring probe according to claim 1, wherein the at least one measuring head is arranged in a housing, which is attached to the guide bar in such a way that it is moveable with at least one degree of freedom.

3. Measuring probe according to claim 2, wherein the housing, which receives the measuring head, and the guide bar are interconnected by a ball-and-socket joint.

4. Measuring probe according to claim 1, wherein the at least one measuring head is arranged on a carrier plate which is retained by a plurality of strip-shaped spring elements arranged side by side.

5. Measuring probe according to claim 4, wherein the strip-shaped spring elements are arranged on the carrier plate and are opposingly connectable to the guide bar via a connection element.

6. Measuring probe according to claim 4, wherein the spring elements are arranged side by side in a common plane and at a distance from one another and are applied relative to one another in the centre of gravity of the carrier plate or the probe unit.

7. Measuring probe according to claim 4, wherein the spring elements are electrically conductive.

8. Measuring probe according to claim 4, wherein the carrier plate is placed in a housing and the spring elements are arranged so as to be freely removable from the housing.

9. Measuring probe according to claim 4, wherein an energy storage element is arranged between the carrier plate and the housing, as a result of which energy storage element the at least one measuring head is mounted immersably relative to the housing.

10. Measuring probe according to claim 1, wherein at least one auxiliary pole is provided adjacent to the at least one measuring head and is formed as a contact spherical cap, roller or sliding element.

11. Measuring probe according to claim 10, wherein in a region between the at least one measuring head and the at least one auxiliary pole, the hinge axis or the ball-and-socket joint is arranged for connecting the housing to the guide bar, as a result of which the housing is held relative to the guide bar in a pivotable manner.

12. Measuring probe according to claim 10, wherein the hinge axis connecting the housing and the guide bar or the ball-and-socket joint is positioned nearer to the measuring head than to the auxiliary pole.

13. Measuring probe according to claim 1, wherein the at least one measuring head detects a layer thickness by a magentic induction method, by an eddy current method or by a d.c. field method, and the at least one further measuring head detects a layer thickness by any one of the aforementioned methods.

14. Measuring probe according to claim 13, wherein when measuring curved surfaces the two measuring heads are oriented relative to the guide bar or gripping element in a line relative to the measurement along a surface line on the curved surface of the object to be measured.

15. Measuring probe according to claim 14, wherein two auxiliary poles and a measuring head or two different measuring heads and one auxiliary pole are provided which together form a three-point bearing.

16. Measuring probe according to claim 1, wherein the measuring head or the sensor element of the measuring head is arranged so that it is at least slightly moveable in the housing along its longitudinal axis.

17. Measuring probe according to claim 1, wherein an antitwist protection or an energy storage element is provided between the guide bar and the measuring head, which positions the measuring head in a position which is inclined to the guide bar.

18. Measuring probe according to claim 1, wherein the guide bar comprises at least one sliding surface or contact surface on one internal side of the curved base body.

19. Measuring probe according to claim 1, wherein the guide bar has a U-shaped recess extending in the longitudinal direction, which extends along an internal side of the curved base body, into which signalling lines, leading to the measuring head, are guided.

20. Measuring probe according to claim 1, wherein the guide bar has a curved design over its whole length.

21. Measuring probe according to claim 1, wherein the guide bar is formed in a number of parts and each two adjacent bar portions of the guide bar are interconnected by a coupling element.

22. Measuring probe according to claim 21, wherein the coupling element comprises a flexible kink which returns into its starting position by a forced deflection.

23. Measuring probe according to claim 21, wherein the coupling element comprises a plug-in contact for a through connection in order to connect the signal line.

24. Measuring probe according to claim 1, wherein the guide bar is formed from spring steel, and is produced by machining or by a forming process or the guide bar is formed from a thermoplastic elastomer, which is produced by machining or a bending-press process or the guide bar is produced from a plastic composite matrix, in which the signal lines are at least partly moulded or embedded.

* * * * *